United States Patent [19]

Wachsman

[11] Patent Number: 4,493,247
[45] Date of Patent: Jan. 15, 1985

[54] APPARATUS FOR IMPROVEMENT OF AIR QUALITY IN PASSENGER AIRPLANE CABINS

[75] Inventor: Mordechai Wachsman, Tel-Aviv, Israel

[73] Assignee: Amcor Ltd., Tel-Aviv, Israel

[21] Appl. No.: 504,264

[22] Filed: Jun. 14, 1983

[30] Foreign Application Priority Data

Jul. 12, 1982 [IL] Israel ............ 66297

[51] Int. Cl.³ .............. F24F 7/06
[52] U.S. Cl. .............. 98/1; 98/1.5; 55/385 A; 361/231; 422/121
[58] Field of Search .............. 55/135–137, 55/139, 279, 385 A; 98/1.5, 40 A, 41 AV, 1; 361/230, 231, 235; 422/121

[56] References Cited

U.S. PATENT DOCUMENTS

| 3,192,848 | 7/1965 | Townsend | 98/1.5 |
| 3,780,941 | 12/1973 | Blackwell | 98/1.5 |
| 4,092,907 | 6/1978 | Meyer et al. | 98/40 A |
| 4,366,525 | 12/1982 | Baumgartner | 98/40 A |

FOREIGN PATENT DOCUMENTS

| 2909628 | 9/1980 | Fed. Rep. of Germany | 98/1.5 |
| 392945 | 5/1933 | United Kingdom . | |
| 1263020 | 2/1972 | United Kingdom . | |
| 2029003 | 3/1980 | United Kingdom . | |

Primary Examiner—David L. Lacey

[57] ABSTRACT

Apparatus for improvement of air quality in passenger airplane cabins comprising a source of pressurized air coupled to a central conduit system including a plurality of outlets distributed throughout the passenger compartment of a passenger aircraft, a plurality of outlet devices each communicating with an outlet of the central conduit system, each of the outlet devices having an outlet air path therethrough, and ionization apparatus disposed in the air flow path for ionizing air passing therethrough.

11 Claims, 3 Drawing Figures

APPARATUS FOR IMPROVEMENT OF AIR QUALITY IN PASSENGER AIRPLANE CABINS

FIELD OF THE INVENTION

The present invention relates to ventilation apparatus for aircraft, particularly passenger aircraft.

BACKGROUND OF THE INVENTION

Various types of ventilation apparatus are known for use in passenger aircraft. One very common type of ventilation apparatus is coupled to the aircraft pressurization and air conditioning system and comprises a central pressurized air distribution unit having a plurality of outlets each corresponding to a passenger position within the aircraft. A ball and socket valve type outlet is provided adjacent each passenger position and comprises a socket in which is seated a ball type outlet nozzle, the nozzle having a permitted range of movements in three dimensions. Threadably mounted on the nozzle is a sleeve whose orientation relative to the nozzle's stem determines the amount of flow of pressurized air passing through the nozzle.

SUMMARY OF THE INVENTION

The present invention seeks to provide a combination air conditioning outlet and air treatment device which is particularly useful for removing particulate matter such as cigarette smoke from the air causing it to settle on surfaces of the aircraft interior, thus reducing the unpleasant and health endangering effects of the presence of cigarette smoke in the air.

There is thus provided in accordance with an embodiment of the invention ventilation and air treatment apparatus for use in a passenger aircraft comprising a source of pressurized air coupled to a central conduit system defining a plurality of outlets distributed throughout the passenger compartment of a passenger aircraft, a plurality of outlet devices each communicating with an outlet of the central conduit system, each of the outlet devices defining an outlet air path therethrough, and ionization apparatus disposed in the air flow path for ionizing air passing therethrough.

Further in accordance with an embodiment of the present invention, the outlet device comprises a directional flow controllable pressurized air outlet of conventional construction.

Further in accordance with an embodiment of the present invention there is provided ionization apparatus arranged to be associated with a conventional pressurized air outlet of a passenger aircraft without requiring replacement of the outlet housing.

BRIEF DESCRIPTION OF THE DRAWING

The invention will be more fully understood and appreciated from the following detailed description taken in conjunction with the drawings in which.

DETAILED DESCRIPTION OF THE INVENTION

Figure 1:
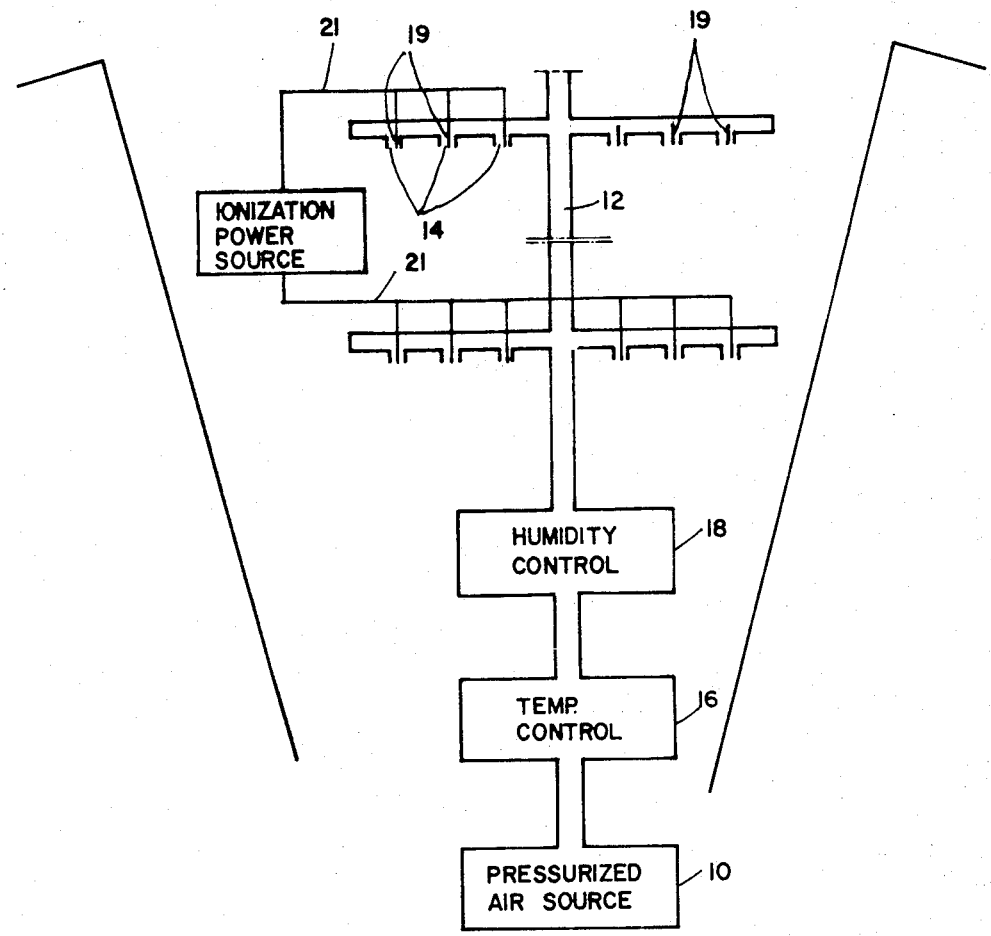
FIG. 1 is a diagrammatic illustration of a ventilation system for passenger aircraft constructed and operative in accordance with an embodiment of the invention.

Reference is now made to FIG. 1 which illustrates in diagramatic form a central air conditioning system constructed and operative in accordance with the present invention and comprising a source of pressurized air 10 coupled to a conduit system 12 which extends to a plurality of outlets 14 each preferably associated with a passenger location within the passenger compartment of a passenger aircraft. Also associated with the conduit at any desired location therealong is temperature control apparatus 16 which may comprise heating or air conditioning apparatus or a combination of both so as to provide the desired temperature control of the air supplied to the passenger compartment in accordance with ambient conditions. Humidity control apparatus 18 may also be associated with the ventilation apparatus described hereinabove is desired.

At each outlet 14 there is provided an outlet device which, in accordance with a preferred embodiment of the invention, includes a directional nozzle defining an air flow passage therethrough of selectable cross section. In accordance with a preferred embodiment of the invention there is provided ionization apparatus 19 in association with the air flow passage for ionizing all or part of the air passing therethrough with negative ions.

It is a particular feature of the present invention that the negative ions thus produced and distributed throughout the passenger compartment are operative to remove particulate matter from the air in the passenger compartment. This is particularly useful when it is sought to remove smoke from cigarettes and the like from the passenger compartment. The presence of ionized air causes the smoke particles to become ionized and thus to adhere to surfaces defining the environment such as the walls of the aircraft cabin and the seats located therein. The net effect is that a significantly lower of amount of smoke and similar particulate matter is thus to be found at any given time in the air that is breathed by the passengers. The positive effects of this result from a health standpoint are well known.

The ionization apparatus disposed in each of the outlet devices is coupled via an electrical conductor 21 to a central source of electrical power. According to one embodiment of the invention the source of electrical power may be a high voltage source suitable for direct connection to the ionization apparatus. According to a preferred embodiment of the invention however, the electrical supply is of a low voltage nature typically 24 volts and is supplied to a power unit located adjacent the outlet device.

Figure 2:
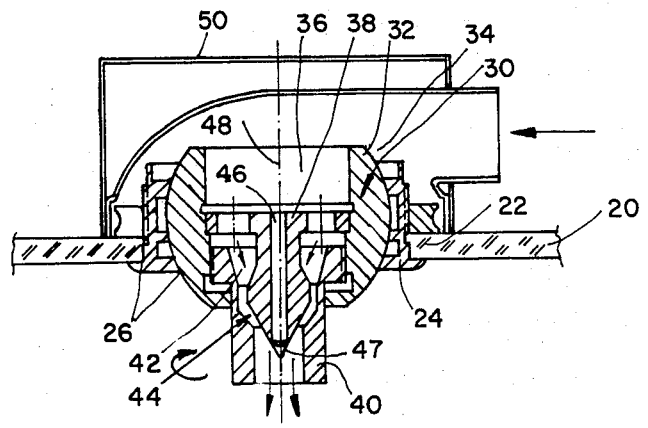
FIG. 2 is a sectional illustration of a outlet device constructed and operative in accordance with a preferred embodiment of the invention.

Reference is now made to FIG. 2 which illustrates in sectional illustration a typical outlet device constructed and operative in accordance with an embodiment of the invention. The entire device is mounted preferably as part of a passenger service unit whose surface panel is indicated by reference numeral 20. Securely mounted in an aperture 22 defined in panel 20 is an outlet housing 24 which defines a plurality of peripheral sliding support surfaces 26 which are arranged to have an overall spherical configuration and thus provide secure mounting of a nozzle portion 30 therewithin. The mounting of nozzle portion 30 within housing 24 is such that nozzle portion 30 may be rotated as desired in three dimensions within a predetermined range of positions, so as to permit a passenger to select the direction in which the pressurized air is to travel. The nozzle portion 30 comprises a base portion 32 having a double tricated spherical outer surface 34 and a central bore 36. Disposed within bore 36 and fixed with respect to base portion 32 is a nozzle defining valve stem 38. Threadably mounted onto base portion 32 is a sleeve member 40 which is arranged coaxially with valve stem 38 such that the axial disposition of the sleeve member 40 relative to the base portion 32, determined by threading engagement thereof, determines the cross sectional area of an air flow through pathway 42 defined between the outside surface of the valve stem 38 and the inside surface of the sleeve member 40, particularly at a narrowed portion thereof indicated generally by reference numeral 44.

Located in a central axial bore 46 of stem 38 and extending forwardly therefrom into engagement with the air flow through pathway 42 is an ionization needle 47 which is coupled to a source of high voltage, from 3000–10000 volts, by means of a conductor 48. The source of high voltage is located within a power unit housing 50 and will be described hereinafter in greater detail.

Figure 3:
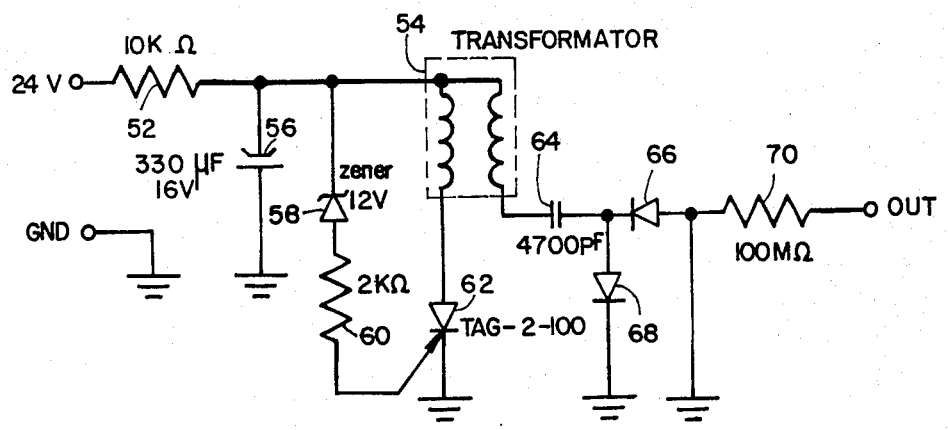
FIG. 3 is an electrical schematic diagram of power supply circuitry suitable for use with the present invention.

Reference is now made to FIG. 3 which illustrates a preferred embodiment of high voltage power source useful in the present invention. The power source receives power from a standard 24 volts power supply which is commonly provided in passenger aircraft. The 24 volt input is supplied over a 10 KOHM resistor 52 to an input of a transformer such as a micro transformer 54. The input of transformer 54 is coupled to ground across a 330 microfarad capacitor 56 and is also coupled across a zener diode 58 connected in series with a 24 KOHM resistor 60 to a TAG-2-100 diode 62 for over voltage protection. The transformer 54 is coupled across a 4700 PF capacitor 64 to the junction of a pair of zener diodes 66 and 68 of opposite plurality. The opposite pole of zener diode 66 is coupled across a 100 milli OHM resistor 70 to provide the high voltage output.

It will be appreciated by persons skilled in the art that details of the circuit of the high voltage power source as well as constructional details of designs of the outlet device described hereinabove are merely examples of possible constructions thereof and do not limit the scope of the invention. The scope of the invention is defined only by the claims which follow:

I claim:

1. Ventilation and air quality treatment apparatus for passenger aircraft comprising:
   a source of pressurized air;
   a conduit network coupled to said source of pressurized air and to a multiplicity of outlet devices, each of said outlet devices being adapted to be positioned adjacent to an individual passenger location;
   said multiplicity of outlet devices each constructed so as to define a pressurized air flow pathway therein; and
   a plurality of individual ionization means each disposed in the air flow pathway of one of said outlet devices for providing ionization of the air passing therethrough.

2. Ventilation and air quality treatment apparatus according to claim 1 and wherein each of said outlet devices comprises means for providing a selectively directable flow of air.

3. Apparatus according to claim 2 and wherein each of said outlet devices comprises valve means for governing the amount of air through said air flow pathway.

4. Apparatus according to claim 3 and also comprising a high voltage power source connected to said ionization means.

5. Apparatus according to claim 2 and also comprising a high voltage power source connected to said ionization means.

6. Apparatus according to claim 1 and wherein each of said outlet devices valve means for governing the amount of air through said air flow pathway.

7. Apparatus according to claim 6 and also comprising a high voltage power source connected to said ionization means.

8. Apparatus according to claim 1 and also comprising a high voltage power source connected to said ionization means.

9. Ventilation and air quality treatment apparatus for passenger aircraft comprising:
   a source of pressurized air;
   a conduit network coupled to said source of pressurized air and to a multiplicity of outlet devices, each of said devices being adapted to be positioned adjacent to an individual passenger location;
   said multiplicity of outlet devices each constructed so as to define a pressurized air flow pathway and each comprising a valve means for governing the amount of air through said air flow pathway; and
   a plurality of individual ionization means each disposed in the air flow pathway of one of said outlet devices for providing ionization of the air passing therethrough.

10. Apparatus according to claim 9 and further comprising a high voltage power source connected to said individual ionization means.

11. Apparatus according to claim 9 and wherein each of said outlet devices comprises means for providing a selectively directable flow of air.

* * * * *